(12) United States Patent
Shareef et al.

(10) Patent No.: US 7,176,405 B2
(45) Date of Patent: Feb. 13, 2007

(54) HEAT SHIELD FOR THERMAL PROCESSING

(75) Inventors: Iqbal A. Shareef, Fremont, CA (US); Boris Grek, Hayward, CA (US); Michael O. Thompson, Ithaca, NY (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 11/112,647

(22) Filed: Apr. 22, 2005

(65) Prior Publication Data
US 2006/0237403 A1    Oct. 26, 2006

(51) Int. Cl.
*B23K 26/00* (2006.01)

(52) U.S. Cl. .............................. 219/121.6; 219/121.65; 219/121.66

(58) Field of Classification Search ............. 219/121.6, 219/121.65, 121.66, 121.73, 121.84
See application file for complete search history.

(56) References Cited

U.S. PATENT DOCUMENTS

| | | | |
|---|---|---|---|
| 4,642,445 A * | 2/1987 | Stol ....................... | 219/121.84 |
| 6,747,245 B2 | 6/2004 | Talwar et al. ............ | 219/121.8 |
| 6,994,748 B2 * | 2/2006 | Moriya et al. ................ | 117/14 |
| 7,098,155 B2 * | 8/2006 | Talwar et al. ............... | 438/795 |
| 2002/0137311 A1 * | 9/2002 | Timans ....................... | 438/487 |
| 2004/0173585 A1 | 9/2004 | Talwar et al. ........... | 219/121.63 |
| 2005/0067384 A1 * | 3/2005 | Talwar et al. ............ | 219/121.6 |

FOREIGN PATENT DOCUMENTS

JP          61-166924 A    *   7/1986

* cited by examiner

*Primary Examiner*—Geoffrey S. Evans
(74) *Attorney, Agent, or Firm*—Allston L. Jones

(57) ABSTRACT

A heat shield (10) that facilitates thermally processing a substrate (22) with a radiation beam (150) is disclosed. The heat shield is in the form of a cooled plate adapted to allow the radiation beam to communicate with the substrate upper surface (20) over a radiation beam path (BP), either through an aperture or a transparent region. The heat shield has an operating position that forms a relatively small gap (170) between the lower surface (54) of the heat shield and the upper surface of the wafer. The gap is sized such that the formation of convection cells (200) is suppressed during substrate surface irradiation. If convection cells do form, they are kept out of the radiation beam path. This prevents the radiation beam from wandering from the desired radiation beam path, which in turn allows for uniform heating of the substrate during thermal processing.

22 Claims, 9 Drawing Sheets

HEAT SHIELD FOR THERMAL PROCESSING

CROSS-REFERENCE TO RELATED APPLICATIONS

The present invention is related to the following patents and patent applications: U.S. Pat. No. 6,747,245 (the '245 patent), entitled "Laser Scanning Apparatus and Method for Thermal Processing", U.S. patent application Ser. No. 10/787,664, entitled "Laser Scanning Apparatus and Methods for Thermal Processing", filed on Feb. 26, 2004, U.S. patent application Ser. No. 10/806,014, entitled "Laser Scanning Apparatus and Methods for Thermal Processing", filed on Mar. 22, 2004, and published as U.S. Patent Application Serial No. 20040173585 on Sep. 09, 2004, U.S. patent application Ser. No. 10/674,106, entitled "Method of Annealing Undoped Silicon Substrates", filed on Sep. 29, 2003, and U.S. patent application Ser. No. 10/762,861, entitled "Laser Thermal Annealing of Lightly Doped Silicon Substrates", filed on Jan. 22, 2004, all of which are assigned to the common Assignee Ultratech, Inc. of San Jose, Calif., and all of which are incorporated by reference herein.

BACKGROUND OF THE INVENTION

1. Field of the Invention

The present invention relates to the field of thermal processing, and has particular industrial utility in the field of laser thermal processing (LTP) of silicon substrates in the manufacturing of semiconductor devices.

2. Description of the Prior Art

LTP is a technique for manufacturing semiconductor devices such as integrated circuits or "ICs". LTP involves irradiating a substrate, such as a doped semiconductor wafer, to rapidly bring the substrate surface from a relatively low temperature (e.g., 400° C.) to a relatively high temperature (e.g., 1,300° C.) so that the substrate bulk can pull the temperature down quickly. Such a rapid thermal cycle might be used, for example, to efficiently activate dopants in the substrate because only the material very close to the top surface of the substrate is heated to the relatively high temperature during irradiation.

As described in U.S. Pat. No. 6,747,245, one approach to LTP involves scanning a long, narrow laser beam back and forth across the substrate surface in a raster pattern. The amount of time the laser beam resides over a given point on the substrate surface is called the "dwell time". Using this scanning approach, it is possible to achieve peak surface temperatures near 1350° C. with dwell times in the millisecond range. The result is a rapid thermal annealing of doped substrates that yields high activation levels with very little dopant diffusion. When used to fabricate transistor-based circuits, transistors with a sharply defined dopant profile and with a small sheet resistance are formed. LTP is capable of providing significantly lower sheet resistance values than possible using so-called Rapid Thermal Processing (RTP), which has dwell times equivalent to several seconds.

During LTP, it is usually necessary to pre-heat the substrate to 400° C. in order to ensure good coupling between the incident $CO_2$ beam and the top of the substrate. Natural convection in the air space directly above the heated substrate surface leads to convective cells and time-varying air density changes that pass through the path of the annealing beam. These air density changes cause the path of the radiation beam to wander (dither). This, in turn, causes the amount of laser power delivered to the substrate surface to be distributed unevenly. Such variations can translate into unacceptable temperature non-uniformities at the substrate surface and lead to variations in IC performance.

SUMMARY OF THE INVENTION

When substrates are heated during thermal processing-by substrate pre-heating and/or by irradiation by the LTP radiation beam-convection cells are created in the air space above the substrate surface and in the path of the radiation beam. The degree of natural convection is represented by a characteristic dimensionless number called "Grashoff's number", G, which is the ratio of buoyant forces to viscous forces. A low Grashoff's number (i.e., G<100 or so) corresponds to weak natural convection. The Grashoff's number varies as the cube of the air gap dimension above the substrate surface and inversely with the square of the air density.

The present invention is a heat shield located just above the substrate surface during thermal processing. The small air gap between the heat shield and the heated substrate significantly suppresses natural convection in the gap between the heated substrate and the shield including the region where the substrate was irradiated. Modeling of the fluid dynamics and heat transport reveals that large convection cells that would otherwise form above in the air space above the substrate surface are substantially reduced in size or eliminated by the shield and are prevented from perturbing the path of the radiation beam.

One aspect of the invention is a heat shield in the form of a cooled plate. The heat shield is adapted to allow passage of a radiation beam through the heat shield to the substrate being thermally processed. This is accomplished by providing either an aperture in the heat shield, by making the heat shield transparent, or by including a transparent window in an otherwise opaque heat shield. When the heat shield is arranged in its operating position relative to a substrate, it forms an air gap above the substrate surface, which in an example embodiment is in the range between about 1 mm and about 5 mm. The result is that no convection cells are formed in the radiation beam path so that the radiation beam does not wander as it is scanned over the substrate surface.

These and other aspects of the invention are described in detail below.

Figure 1:
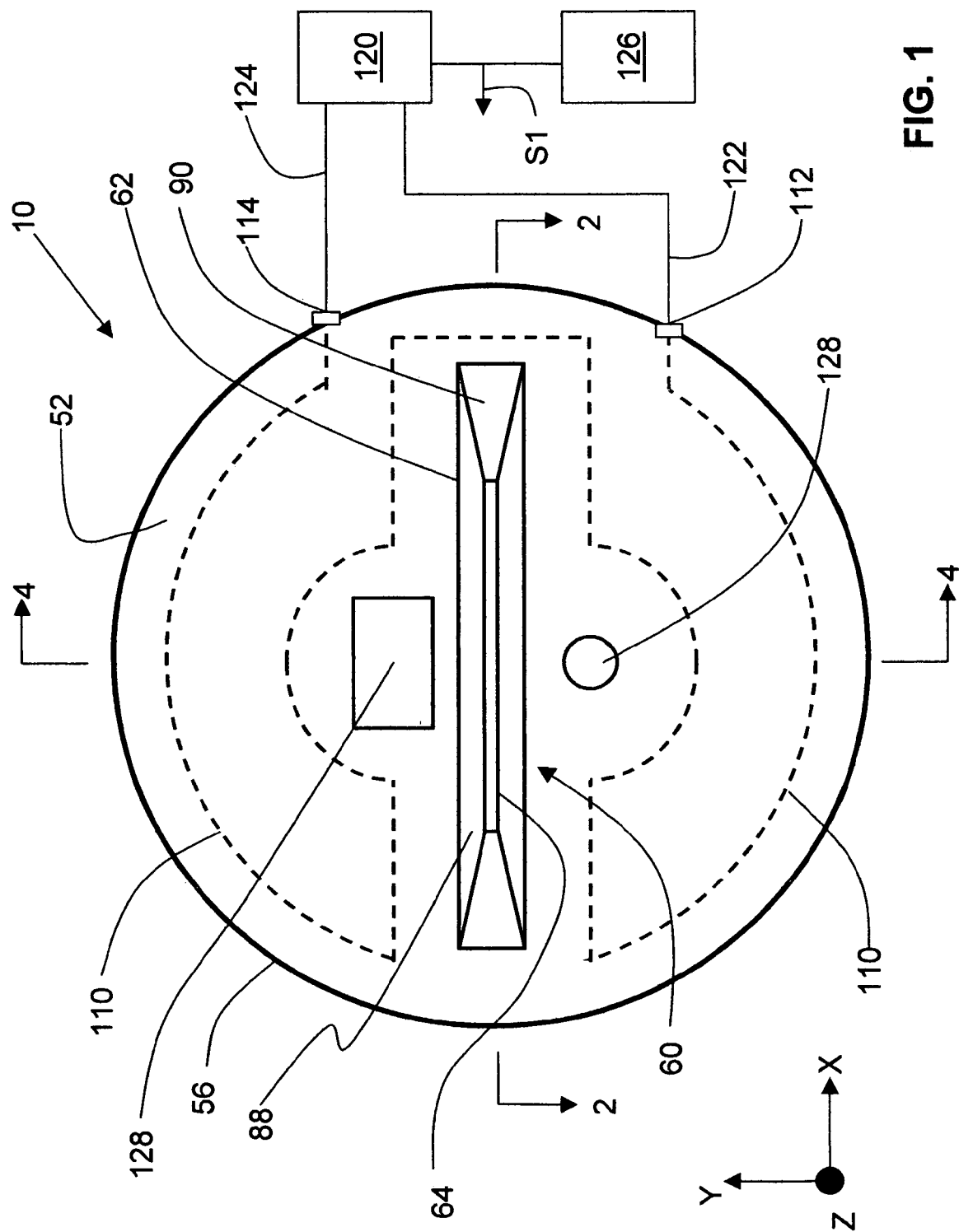
FIG. 1 is a plan view of an example embodiment of a heat shield according to the present invention.

In the coordinate axes shown in the drawings, an axis represented by a dark circle points out the paper, while an axis represented by a white circle points into the paper.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

Figure 2:
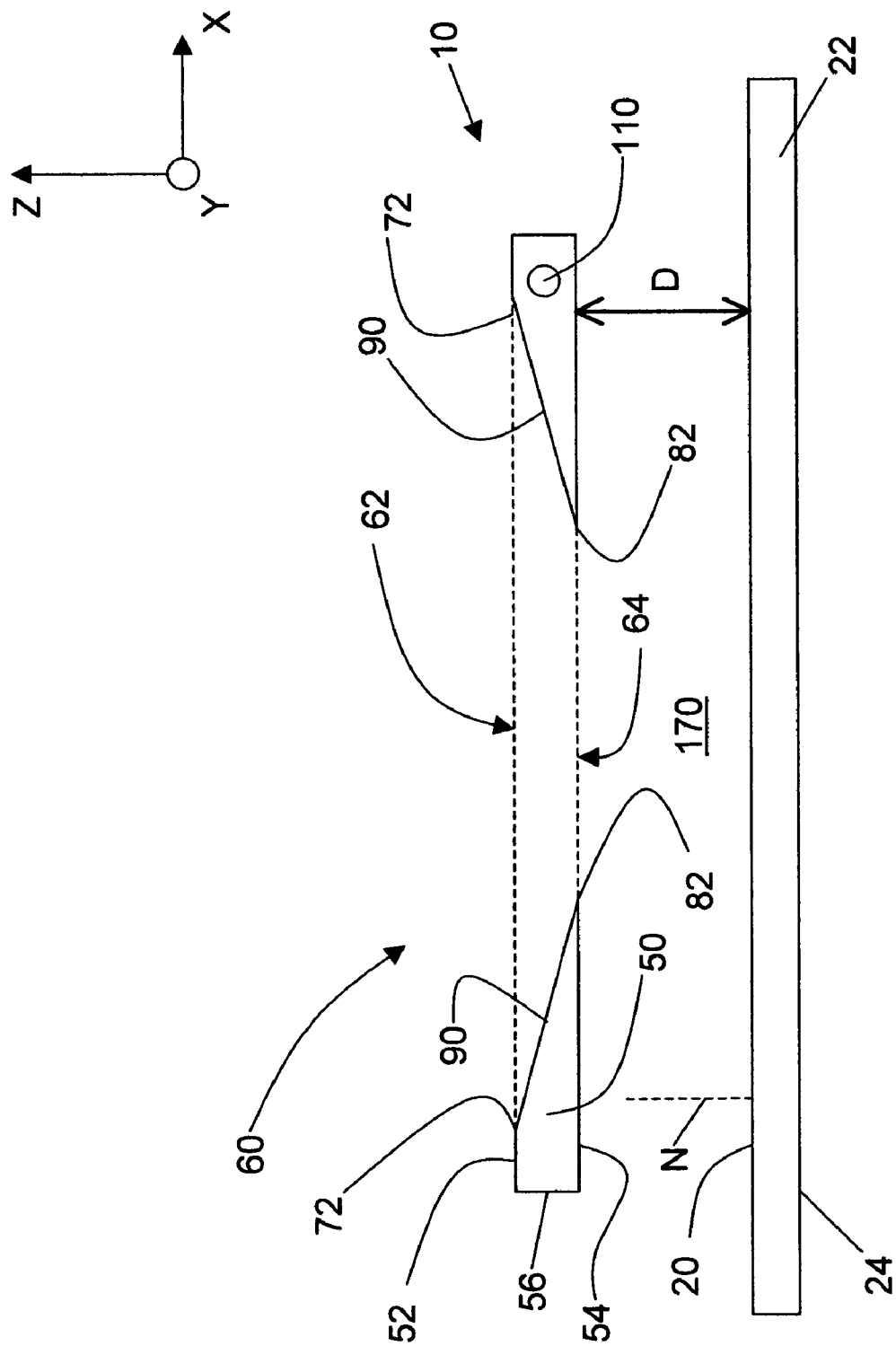
FIG. 2 is a cross-sectional view of the heat shield of FIG. 1 taken along the line 2—2 in FIG. 1 (i.e., as viewed in the -Z direction), and also showing a substrate for the sake of reference.

FIG. 1 is a plan view of an example embodiment of a heat shield 10 according to the present invention. FIG. 2 is a cross-sectional view of heat shield 10 taken along the line 2—2 in FIG. 1 (i.e., as viewed looking in the -Z direction), showing the heat shield residing above a surface 20 of a substrate 22. Substrate 22 includes an outer perimeter 24. In an example embodiment, substrate 22 is a semiconductor wafer. In an example embodiment, heat shield 10 is made of metal such as aluminum. In an example embodiment, heat shield 10 is anodized to reduce radiation reflected from substrate surface 20 during thermal processing.

With reference to FIGS. 1 and 2, in an example embodiment heat shield 10 includes a body portion 50 in the form of a plate having an upper surface 52, an opposing lower surface 54, and an outer perimeter 56. Heat shield 10 includes an aperture 60 formed in body portion 50. In an example embodiment, aperture 60 is centrally located in body portion 50, and is defined by an elongate (e.g., rectangular) opening 62 at upper surface 52 and a smaller elongate (e.g., rectangular) opening 64 at lower surface 54. Opening 62 is defined by an inner rim 72, and opening 64 is defined by an inner rim 82. Central aperture thus includes beveled surfaces 88 and 90 that slope inwardly from inner rim 72 at upper surface 52 to inner rim 82 at lower surface 54. Beveled surfaces 88 and 90 are formed to accommodate a radiation beam path BP, discussed in greater detail below (see FIGS. 3 and 4), that is incident on the substrate at an incident angle θ relative to a substrate surface normal N.

In an example embodiment, heat shield 10 includes a cooling conduit 110 within body portion 50. Conduit 110 includes input and output ports 112 and 114 located at or near perimeter 56. Input and output ports 112 and 114 are operably coupled to a cooling fluid supply unit 120 via respective cooling lines 122 and 124. In an example embodiment, the cooling fluid supplied by cooling fluid supply unit 120 is water. A controller 126 is operably coupled to and is adapted to control the operation of cooling fluid supply unit 120 to keep the heat shield cool relative to the temperature of substrate surface 20 during thermal processing of substrate 22.

Figure 3:
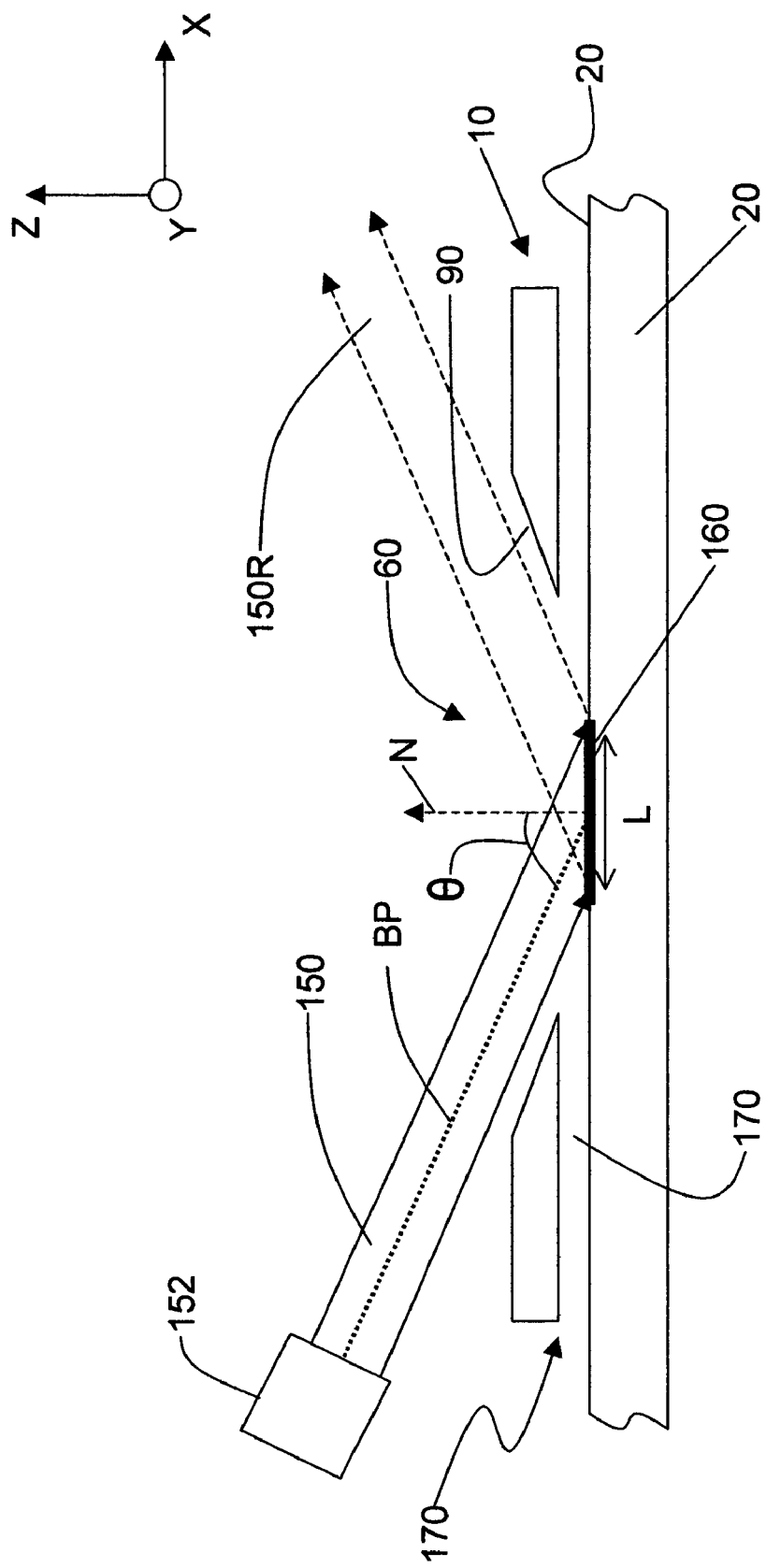
FIG. 3 is cross-sectional view similar to FIG. 2 showing a heat shield in its operable position in close proximity to the substrate surface, and also showing a radiation beam and the corresponding radiation beam path between a radiation source and the substrate surface.
Figure 4:
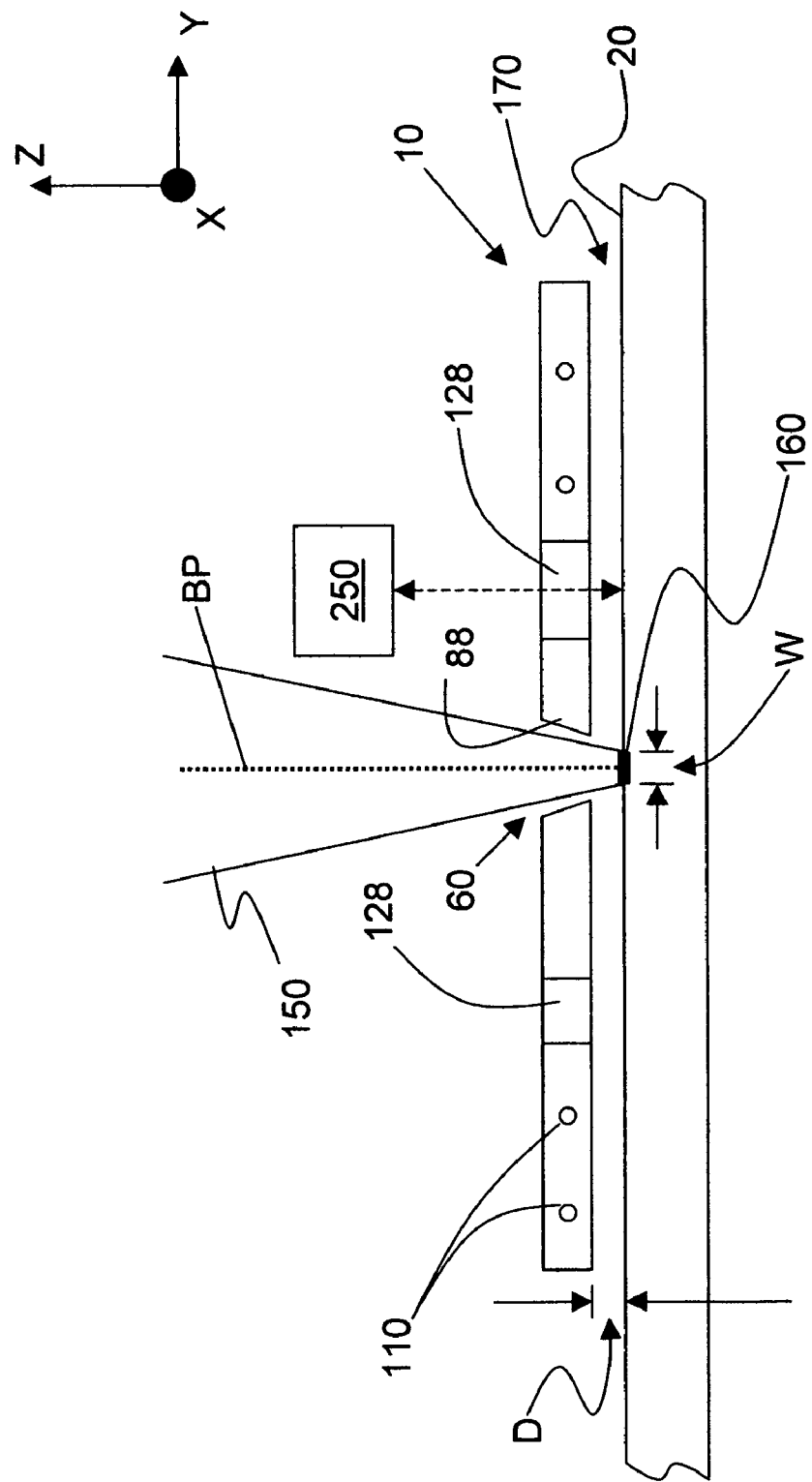
FIG. 4 is a cross-sectional view similar to FIG. 3 taken along the line 4—4 in FIG. 1, i.e., as viewed in the X direction.
Figure 5:
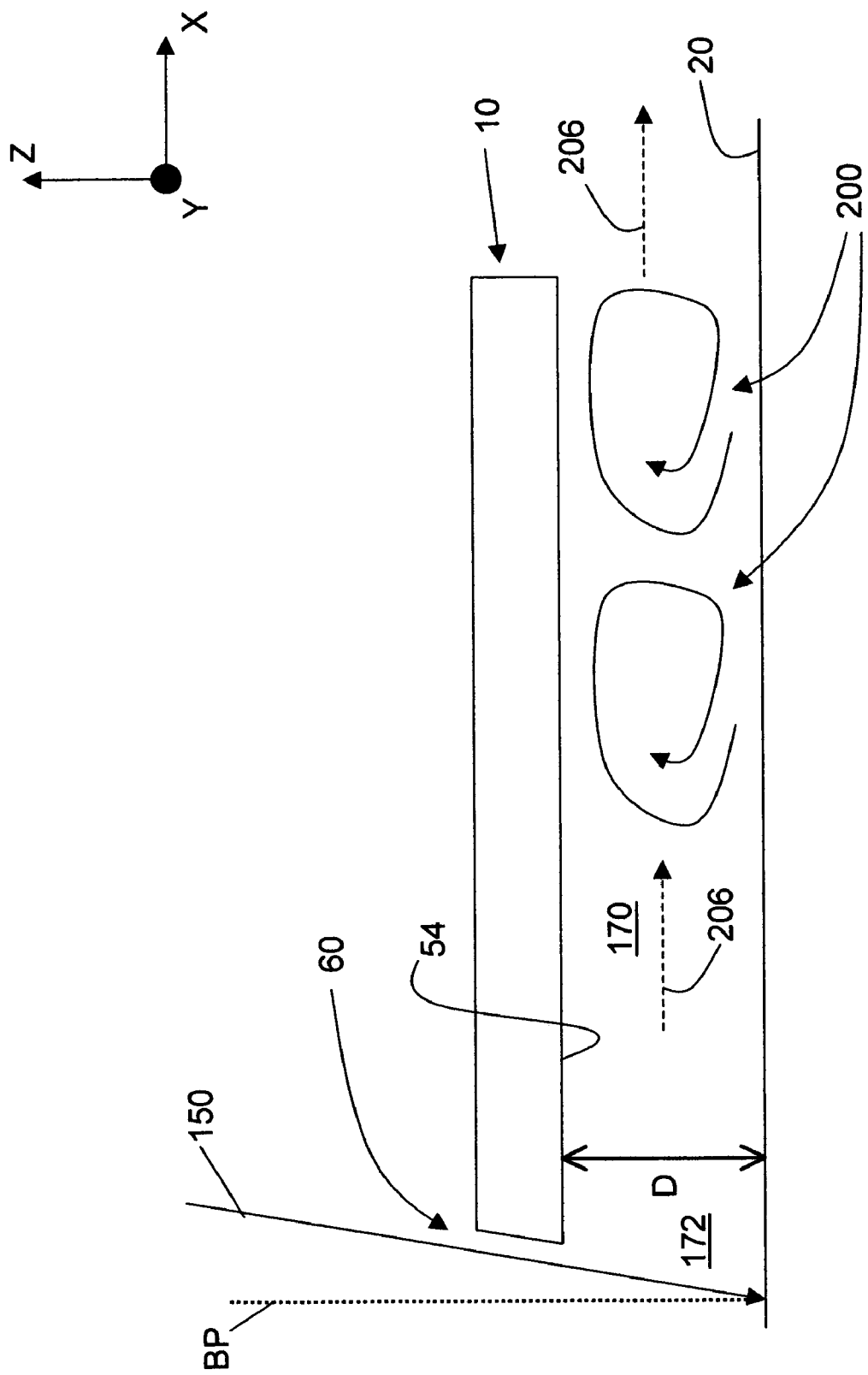
FIG. 5 is a close-up cross-sectional view of a portion of the heat shield and the substrate surface as shown in FIG. 4, showing how the convection cells are removed from the region where the radiation beam irradiates the substrate surface.

FIG. 3 is cross-sectional view similar to FIG. 2, showing heat shield 10 in its operable position, i.e., in close proximity to substrate surface 20. FIG. 4 is a cross-sectional view similar to FIG. 3 taken along the line 4—4 in FIG. 1, i.e., as viewed in the X direction. FIG. 5 is a close-up cross-sectional view of a portion of the heat shield and the substrate surface. In an example embodiment, the preferred distance D separating heat shield lower surface 54 from substrate surface 20 ranges from about 1 mm to about 5 mm.

In an example embodiment, heat shield 10 includes one or more through apertures 128 (see FIGS. 1 and 4) that allow one or more monitoring devices 250 (see FIG. 4), such as temperature sensors and the like, to communicate with substrate 22 through the heat shield. Heat shield 10 is supported above substrate surface 20 using any one of a number of means. An example support structure is discussed in greater detail below. Device(s) 250 can also be arranged to be in operable communication with substrate surface 20 through aperture 60.

FIGS. 3 and 4 also illustrate a radiation beam 150 from a radiation source unit 152. Radiation beam 150 is directed to substrate surface 20 through central aperture 60 along a beam path BP that optically links the radiation source unit to the substrate surface. In an example embodiment, beam path BP is incident the substrate at angle θ relative to substrate surface normal, N. In an example embodiment, angle θ is the Brewster angle for substrate 22, or alternatively, is the angle of minimum reflectivity for p-polarized radiation from substrate surface 20.

Radiation beam 150 is adapted to form an image 160 at substrate surface 20. In an example embodiment, image 160 is a line image of length L and width W, where L>>W. In an example embodiment, L~50 mm and W~0.1 mm. Radiation beam 150 has a wavelength adapted to heat substrate surface 20. In an example embodiment, radiation beam 150 is formed by a $CO_2$ laser that generates radiation at a wavelength of ~10.6 microns.

Method of Operation

In the operation of heat shield 10, controller 126 sends a control signal S1 (FIG. 1) to cooling fluid supply unit 120 to initiate the flow of cooling fluid through conduit 110. In an example embodiment, the temperature of heat shield 10 is kept to within about +/−5° C. of room temperature (~20° C.). When substrate surface 20 is heated via irradiation with radiation beam 150, the air in the region (gap) 170 between heat shield 10 and the substrate surface is heated. As discussed above, this normally causes the formation of convective cells 200 (see FIG. 5) above the substrate surface and in the radiation beam path BP. The presence of convective cells 200 in beam path BP causes radiation beam 150 to dither, which adversely impacts the substrate surface-heating uniformity.

However, heat shield 10 suppresses the formation of convective cells 200 in the small gap between the shield and the substrate and, in the event they do form, keeps them small and located away from the radiation beam path BP. This minimizes the deflection they can impart to the radiation beam. In an example embodiment where lower surface 54 of heat shield 10 is hard anodized, radiation emitted from substrate surface 20 is absorbed by lower surface 54, thereby reducing or eliminating reflections that could otherwise adversely impact the temperature uniformity of the irradiated substrate surface.

Heat shield 10 also reduces the heating of one or more devices 250, such as diagnostic devices (e.g., a temperature monitoring unit), that reside above heat shield upper surface 52 (see FIGS. 1 and 2). In the instance where one or more of devices 250 includes optical components, heat shield 10 prevents non-uniform heating, which creates thermal stress and deformation of these optical components, thus allowing the devices to maintain their original imaging efficiency and/or performance.

SEMI safety standards require shielding of surfaces that are above 70° C. In an example embodiment, heat shield 10 is cooled to well below 70° C., and therefore meets SEMI safety standards for a heat shield.

Transparent Heat Shield

Figure 6:
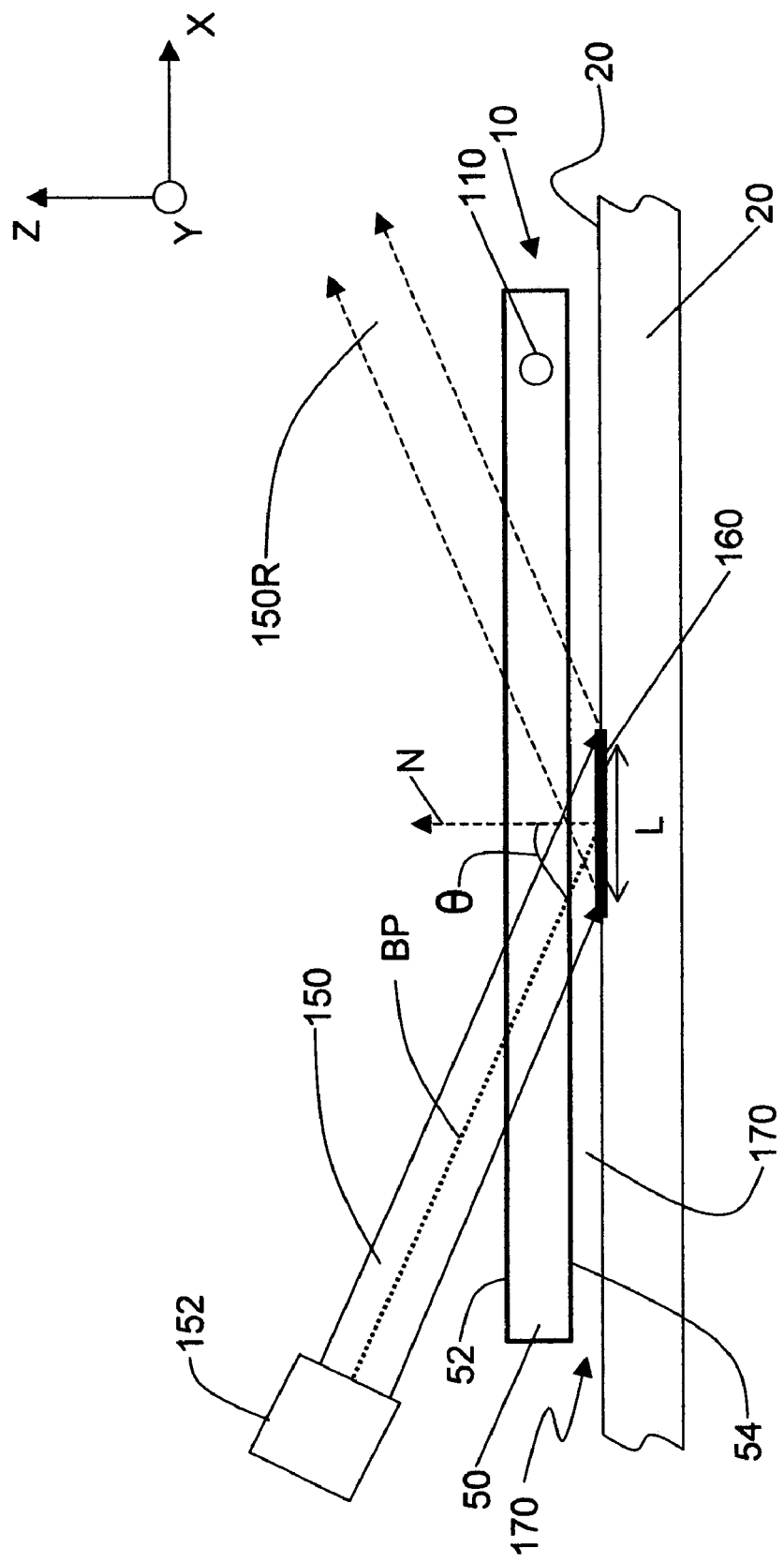
FIG. 6 is a cross-sectional diagram similar to FIG. 3 illustrating an example embodiment of a heat shield that is transparent to the wavelength(s) of light in the radiation beam so that the radiation beam path is through the body of the heat shield.

FIG. 6 is a cross-sectional diagram similar to FIG. 3, illustrating an example embodiment wherein the heat shield body 50 is made of a material transparent to the wavelength(s) in radiation beam RB. This allows radiation beam path BP to pass directly through body 50 rather than through an aperture therein. In an example embodiment, the transparent material is fused silica for wavelengths between 200 nm and 2500 nm or sapphire from 300 nm to 4000 nm. Removing the heat generated by the partial absorption of the radiation beam as it passes through the shield is more challenging with a refractive material. However cooling conduits 110 can be formed as grooves contained between a two-piece laminate structure for body 50. The refraction of radiation beam 150 when passing through body 50 is not shown for ease of illustration.

Opaque Heat Shield with Transparent Window

Figure 7:
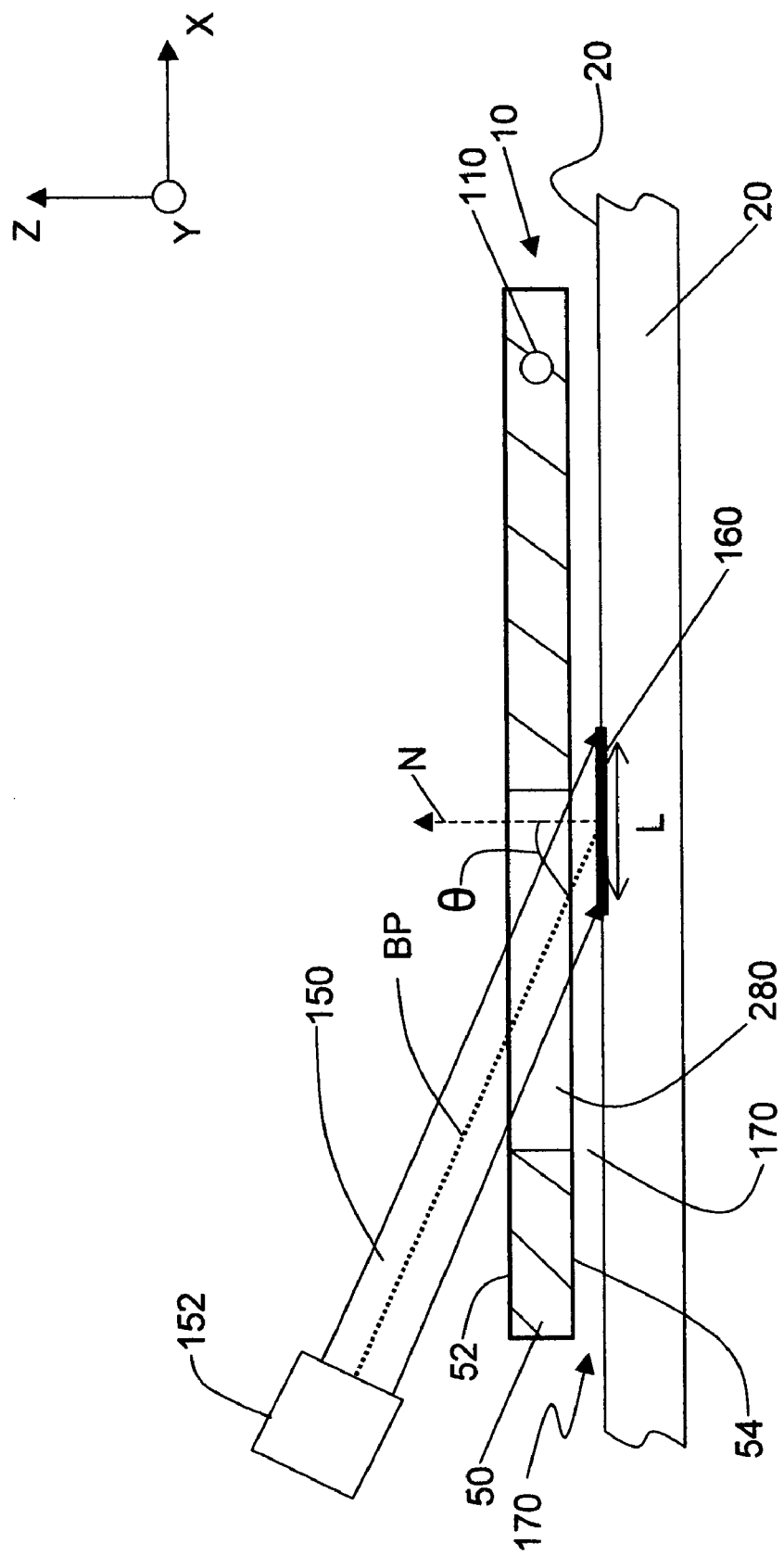
FIG. 7 is a cross-sectional diagram similar to FIG. 6, illustrating an example embodiment wherein heat shield body is opaque except for a window that is transparent to one or more wavelengths in the radiation beam.

FIG. 7 is a cross-sectional diagram similar to FIG. 6, illustrating an example embodiment wherein heat shield body 50 is opaque except for a window 280 formed therein or fixedly inserted therein, that is transparent to one or more wavelengths in radiation beam 150. Window 280 is arranged so that radiation beam path BP passes through the window and to substrate surface 20. The window materials can be those recommended above or a polycrystalline diamond membrane, which is transparent over a very wide spectral range that includes the 10.6 micron $CO_2$ laser wavelength. Diamond has an extraordinary thermal conductivity so that the energy absorbed from the radiation beam 150 can be dissipated by conduction to the water-cooled portion of body portion 50, which serves as a support frame for the window.

LTP System

Figure 8:
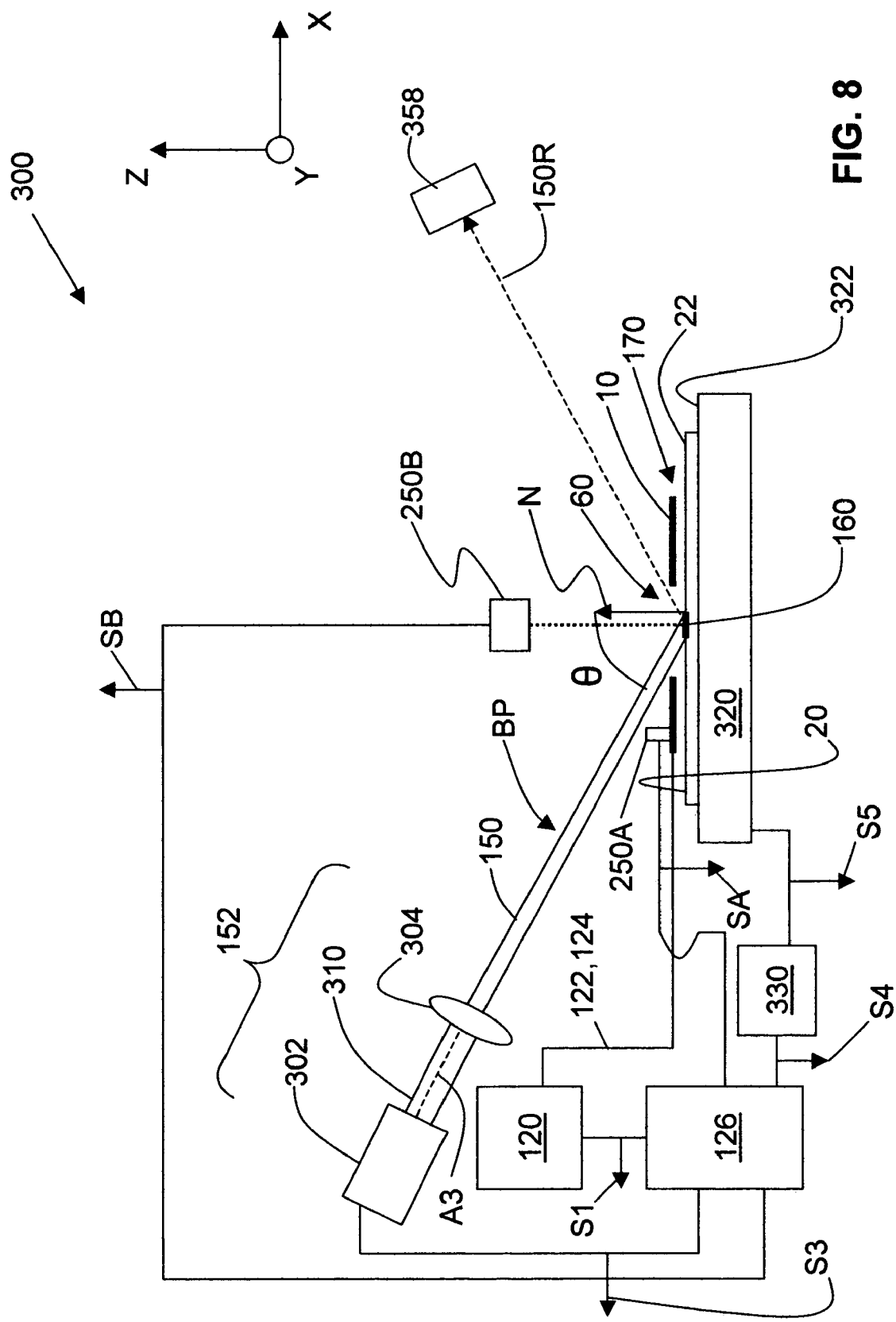
FIG. 8 is a schematic diagram of an LTP system that incorporates the heat shield of the present invention.

FIG. 8 is a schematic diagram of a LTP system 300 that incorporates heat shield 10 of the present invention. LTP system 300 includes radiation beam unit 152, which in an example embodiment includes, in order along an axis A3, a radiation source 302 operably coupled to controller 126, and an LTP optical system 304. Radiation source 302 emits radiation 310 that is received by LTP optical system 304, which forms LTP radiation beam 150. LTP radiation beam 150 travels along radiation beam path BP, which makes an angle θ with substrate surface normal N.

LTP system 300 further includes a movable substrate stage 320 having an upper surface 322 that supports substrate 22. Substrate stage 320 is operably coupled to a stage driver 330, which in turn is operably coupled to controller 126. Substrate stage 320 is adapted to move in the X-Y plane (as well as along the Z-axis) so that the substrate can be scanned relative to LTP radiation beam 150 and image 160.

LTP system 300 further includes heat shield 10 supported above substrate stage upper surface 22. An example support structure for supporting heat shield 10 is discussed in greater detail below in connection with FIG. 9. LTP system 300 also includes cooling fluid supply unit 120 operably coupled to cooling conduit 110 (FIG. 2) via cooling lines 122 and 124, and also operably coupled to controller 126.

LTP system 300 further includes devices 250A and 250B that serve, for example, as diagnostic devices, such as temperature sensors. Devices 250A and 250B are in operable communication with substrate surface 20, e.g., through apertures 128 or through the transparent body portion 50 of heat shield 10. Devices 250A and 250B are operably coupled to controller 126 and provide corresponding diagnostic signals SA and SB (e.g., temperature signals) to the controller, which the controller can use to monitor and adjust the LTP system parameters (e.g., radiation source power) as needed.

In an example embodiment, LTP system 300 includes a beam dump 358 arranged in the path of reflected radiation beam 150R to absorb the reflected radiation and dissipate the resulting heat.

LTP System Operation

With continuing reference to FIG. 8, in the operation of LTP system 300, controller 126 sends a control signal S3 to radiation source 302 to activate the radiation source. In response thereto, radiation source 302 emits radiation 310 that is received by LTP optical system 304, which forms LTP radiation beam 150. LTP radiation beam 150 then proceeds along radiation beam path BP, which passes through central aperture 60 in heat shield 10, or alternatively through transparent body portion 50. LTP radiation beam 150 forms an image (e.g., a line image) 160 at substrate surface 20. Controller 126 also activates stage driver 330 via a control signal S4. Stage driver 330, in turns sends a drive signal S5 to stage 320 that causes the stage to move in the Y-direction so that image 160 is scanned over substrate surface 20.

Also, as described above, controller 126 sends a control signal S1 to cooling fluid supply unit 120 to initiate the flow of cooling fluid through conduits 122 and 124 so that the heat shield is maintained at a temperature substantially cooler than that of the substrate while the substrate is being irradiated by radiation beam following beam path BP.

As heated substrate surface 20 is being thermally processed, the hot substrate surface heats the air in the region between heat shield 10 and the substrate surface. As discussed above in connection with FIG. 5, the temperature difference between the substrate and the ambient air would normally cause convective cells to form above the substrate and in radiation beam path BP. Scanning the radiation beam 150 through such convective cells causes the beam to dither and creates heating non-uniformities. However, heat shield 10 suppresses formation of the convective cells 200 (FIG. 5), and if they do form, keeps them away from radiation beam path BP, thereby stabilizing the position of the LTP radiation beam, which allows for uniform heating of the substrate surface.

Heat Shield Support Structure

Figure 9:
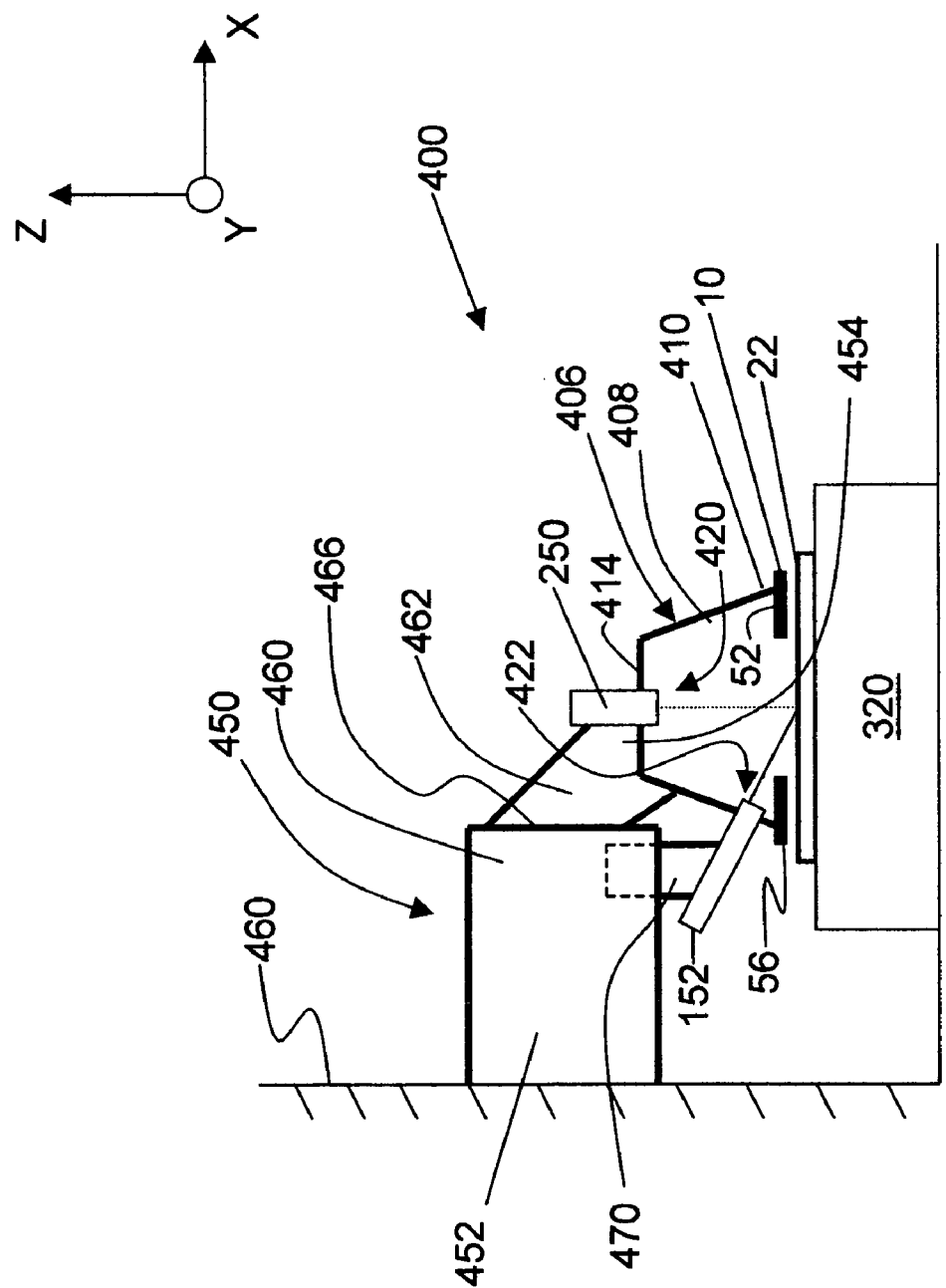
FIG. 9 is a side view of an example embodiment of a support structure for supporting the heat shield in the operating position relative to the substrate surface, wherein refraction effects of the heat shield on the radiation beam are not shown for ease of illustration.

FIG. 9 is a schematic cross-sectional diagram of an example embodiment of a heat shield support structure 400. Support structure 400 includes a frame 406 having a sidewall 408 with an end 410 that is fixed to heat shield upper surface 52 at or near perimeter 56. Sidewall 408 includes an upper portion 414. Support structure 400 includes apertures 420 and 422 that allow for radiation source unit 152 and device(s) 250 to be supported by the support structure while also allowing for their communication with the substrate 22 through the heat shield 10, as described above.

Support structure 400 also includes a support arm 450 with respective ends 452 and 454. End 454 is secured to a portion of sidewall 408, while end 452 is secured to a fixed support body 460, such as a wall or platen that is part of an LTP machine. In an example embodiment, support arm 450 includes two sections 460 and 462 that are movable relative to one another at an interface 466 so that the position of heat shield 10 can be adjusted relative to substrate surface 20. In an example embodiment, support arm section 460 also supports radiation source unit 152 via a movable support member 470 that allows for the radiation source unit to remain in place while support arm section 462 is adjusted.

Other support structures for thee heat shield of the present invention apparent to those skilled in the art may also be used to support heat shield 10 in its operating position above substrate 22, while also allowing for substrates to be readily loaded and unloaded from substrate stage 320.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A heat shield positioned in an operating position just above a heated substrate being thermally processed with a radiation beam, comprising:
   a cooled body portion having a lower surface positioned parallel to the substrate, the body being adapted to pass the radiation beam to the substrate;
   wherein in the operating position the lower surface of the body portion and a substrate surface are separated by a distance in the range from about 1 mm to about 5 mm; and
   wherein the body portion includes one or more apertures that allow for one or more diagnostic devices to communicate with the hottest portion of the substrate surface through the heat shield to the substrate surface.

2. The apparatus of claim 1, wherein the body portion includes an aperture sized to pass the radiation beam to the substrate.

3. The apparatus of claim 2, wherein the body portion is formed from aluminum.

4. The apparatus of claim 3, wherein the aluminum is anodized.

5. The apparatus of claim 1, wherein the body portion includes an aperture sized to pass the radiation beam to the substrate and a radiation beam specularly reflected from the substrate surface.

6. The apparatus of claim 1, wherein the entire body portion is transparent to the one or more radiation beam wavelengths.

7. The apparatus of claim 1, wherein the body portion includes a cooling conduit formed therein, and wherein the apparatus further includes a cooling unit operably coupled to the cooling conduit to cool the body portion relative to a substrate temperature during thermal processing.

8. The apparatus of claim 1, wherein the body portion includes a region that is transparent to the radiation beam so that the radiation beam passes through the transparent region to the substrate surface.

9. A heat shield apparatus for facilitating the thermal processing of a heated substrate surface with a radiation beam formed from radiation from a radiation source, comprising:
   a cooled body portion in the form of a plate;
   wherein the body portion is adapted to provide a radiation beam path between the radiation source and the substrate surface;
   wherein the body portion is arranged in an operating position relative to the substrate surface to form a gap sized to suppress the formation of convection cells in the gap; and
   wherein the body portion includes one or more apertures that allow for one or more diagnostic devices to communicate with the hottest portion of the substrate surface through the heat shield to the substrate surface.

10. The apparatus of claim 9, further including a support frame that supports the heat shield in the operating position.

11. The apparatus of claim 9, wherein the body portion includes an aperture formed in the body portion sized to pass the radiation beam path.

12. The apparatus of claim 11, wherein the body portion includes an aperture formed in the body portion sized to pass the radiation beam path to the substrate and to pass a radiation beam specularly reflected from the substrate.

13. The apparatus of claim 9, wherein the body portion includes a window that is transparent to the radiation beam so that the radiation beam path passes through the transparent body portion region and heats the substrate surface.

14. The apparatus of claim 9 wherein the entire body portion is transparent to the radiation beam.

15. The apparatus of claim 9, wherein the radiation beam path forms an incident angle relative to a surface normal to the substrate surface, and wherein said one or more apertures is/are adapted to accommodate the angled radiation beam path.

16. The apparatus of claim 9, wherein the radiation beam path is oriented to permit said radiation beam passing therethrough to form an incident angle that is either a Brewster angle for the substrate or an angle of minimum reflectivity for p-polarized radiation incident the substrate surface.

17. A method of thermally processing an upper surface of a substrate with a radiation beam capable of heating the substrate, said method comprising the steps of:
   a. arranging a cooled heat shield adjacent the substrate upper surface to form a gap between the substrate upper surface and the heat shield;
   b. irradiating the substrate surface along a radiation beam path that passes either through an aperture in the heat shield or through a window formed in the heat shield that is transparent to one or more wavelengths in the radiation beam; and
   c. performing diagnostic measurements of the substrate through one or more additional apertures formed in the heat shield;
   wherein the gap is formed to suppress convection cell formation in the radiation beam path.

18. The method of claim 17, wherein step b. includes the step of:

c. irradiating the substrate at an incident angle that is either a Brewster angle for the substrate or an angle of minimum reflectivity for p-polarized radiation incident the substrate surface.

19. The method of claim 17, wherein:

the heat shield of step a. includes a cooling conduit; and the method further includes the step of:

c. flowing a cooling fluid through the conduit to maintain the heat shield at a cool temperature relative to that of the substrate being processed.

20. The method of claim 17, wherein the gap is between about 1 mm and about 5 mm.

21. The method of claim 17, wherein the gap is chosen to have an associated Grashoff's number G that is less than about 100.

22. The method of claim 17 wherein the heat shield of step a. is in the form of a plate.

* * * * *